L. P. FLOCK.
RESILIENT VEHICLE TIRE.
APPLICATION FILED MAR. 27, 1914.
1,107,508.
Patented Aug. 18, 1914.
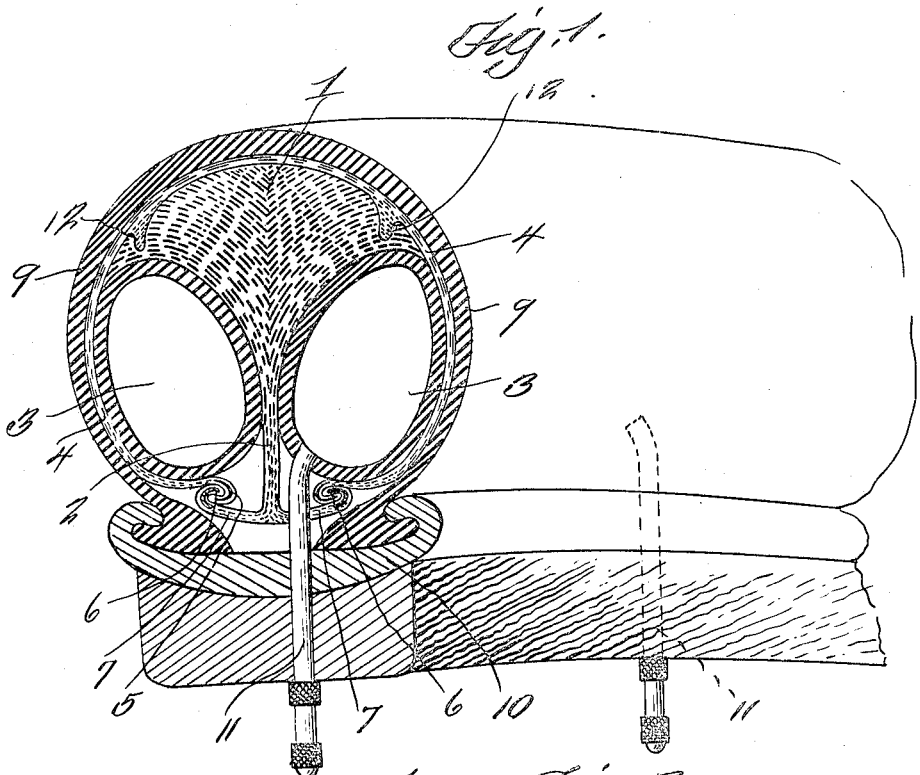
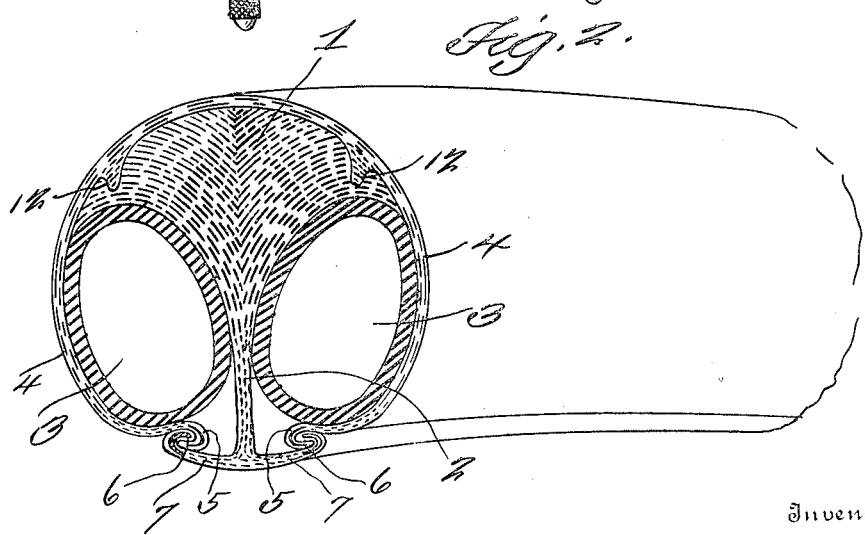
Witnesses
Inventor
L. P. Flock,
By D. Swift & Co,
his Attorneys

UNITED STATES PATENT OFFICE.

LEE P. FLOCK, OF FYFFE, ALABAMA.

RESILIENT VEHICLE-TIRE.

1,107,508.

Specification of Letters Patent. Patented Aug. 18, 1914.

Application filed March 27, 1914. Serial No. 827,645.

*To all whom it may concern:*

Be it known that I, LEE P. FLOCK, a citizen of the United States, residing at Fyffe, in the county of Dekalb and State of Alabama, have invented a new and useful Resilient Vehicle-Tire; and I do hereby declare the following to be a full, clear, and exact description of the invention, such as will enable others skilled in the art to which it appertains to make and use the same.

This invention relates to an improved construction of resilient pneumatic vehicle tire, and the object of the invention is to construct or mold a composition fabric core merging or tapering into a heavy composition fabric central piece arranged between two pneumatic tubes, and connected to the adjacent edges of a fabric covering extending about the core and the pneumatic tubes, all of which is designed to be incased in the usual tire casing.

In practical fields the details of construction may necessitate alterations, falling within the scope of what is claimed.

The invention comprises further features and combination of parts, as hereinafter set forth, shown in the drawings and claimed.

In the drawings:—Figure 1 is a view in perspective of the improved tire constructed in accordance with the invention. Fig. 2 is a sectional perspective view showing the usual outer casing removed.

Referring more particularly to the drawings, 1 designates the core of the tire, which is molded or constructed of a composition of fabric, canvas and some suitable plastic material as shown. This core is substantially of a V-shaped contour, merging or tapering into a heavy centrally arranged piece 2, likewise constructed of fabric or canvas and some suitable plastic material. This central piece is arranged between two pneumatic tubes 3, and constitutes means to balance the tread. Surrounding the core and the pneumatic tube is a fabric or canvas covering 4, the adjacent portions 5 of which are connected at 6 to the laterally extending portions 7 of the centrally arranged piece 2. This form or construction of tire may be incased in any usual form of tire casing, as shown at 9 in Fig. 1, which tire casing is connected to the usual form of rim 10. Extending through the rim and into the pneumatic tubes are the usual forms of check valve controlled tubes 11, whereby the pneumatic tubes may be inflated. By this construction of tire, the same cannot become totally disabled, it being very difficult for even one of the pneumatic tubes becoming punctured, owing to the particular shape of the core which overlies both tubes. However, if one tube becomes punctured, the other remains intact, in which case the vehicle may continue in its travel, substantially regardless of the distance. When one tube becomes punctured, the centrally arranged piece balances and maintains the core substantially in its normal position, the connection 12 between the covering and the core assisting in this regard. In other words, when one or the other of said tubes becomes deflated, by reason of a puncture, the core has a slight tendency to lean toward the punctured pneumatic tube, and in so doing, pulls against the covering 4, owing to the connections 12.

The invention having been set forth, what is claimed as new and useful is:—

A vehicle tire comprising a substantially V-shaped core, merging or tapering into a centrally arranged supporting piece terminating in laterally extending portions, a pair of pneumatic tubes, one upon each side of the centrally arranged supporting piece, and over which each side of the core overlies, thereby protecting the tubes, and a covering of fabric surrounding the core and the tube and connected to laterally extending portions of the central piece.

In testimony whereof I have signed my name to this specification in the presence of two subscribing witnesses.

LEE P. FLOCK.

Witnesses:
P. C. HALE,
E. M. BAKER.